United States Patent [19]

Yoshida

[11] Patent Number: 5,113,297
[45] Date of Patent: May 12, 1992

[54] MAGNETIC DISK DRIVE HAVING A MECHANISM FOR PREVENTING A DISK CARTRIDGE FROM BEING INSERTED THEREIN WITH WRONG ORIENTATION AND FOR FIXING THE DISK CARTRIDGE INSERTED THEREIN WITH CORRECT ORIENTATION

[75] Inventor: Kobun Yoshida, Sayama, Japan
[73] Assignee: TEAC Corporation, Tokyo, Japan
[21] Appl. No.: 615,977
[22] Filed: Nov. 20, 1990

[30] Foreign Application Priority Data

Nov. 22, 1989 [JP] Japan .................. 1-135535[U]

[51] Int. Cl.⁵ .................. G11B 5/012; G11B 5/55; G11B 23/03
[52] U.S. Cl. .................. 360/99.06; 360/98.07; 360/99.08; 360/106; 360/133; 360/97.01
[58] Field of Search .................. 360/106, 99.08, 98.07, 360/99.06, 99.02, 133, 104

[56] References Cited

U.S. PATENT DOCUMENTS

| | | | |
|---|---|---|---|
| 3,786,454 | 1/1974 | Lissner et al. | 360/98.07 |
| 4,359,762 | 11/1982 | Stollorz | 360/98.07 |
| 4,639,863 | 1/1987 | Harrison et al. | 360/106 |
| 4,805,054 | 2/1989 | Kamoto et al. | 360/99.08 |
| 4,881,141 | 11/1989 | Hasegawa et al. | 360/106 |
| 4,965,691 | 10/1990 | Ittikar et al. | 360/99.08 |
| 4,974,103 | 11/1990 | Ittikar et al. | 360/99.08 |
| 4,987,506 | 1/1991 | Uehava | 360/106 |
| 5,025,336 | 6/1991 | Morehouse et al. | 360/104 |

FOREIGN PATENT DOCUMENTS

| | | | |
|---|---|---|---|
| 1-162287 | 6/1989 | Japan | 360/104 |
| 1-30068 | 8/1989 | Japan . | |
| 8809551 | 12/1988 | PCT Int'l Appl. | 360/106 |

Primary Examiner—A. J. Heinz
Assistant Examiner—Alfonso Garcia
Attorney, Agent, or Firm—Michael N. Meller

[57] ABSTRACT

A magnetic disk drive has a mechanism for loading and holding a disk cartridge inserted with a correct orientation at a predetermined position, and for preventing a disk from being inserted with a wrong orientation from being loaded at the predetermined position. The mechanism needs so few members that the magnetic disk drive can be made smaller and thinner. Particularly the mechanism is effective for a magnetic disk drive including a disk cartridge and a driving device. The disk cartridge is an apparatus having at least a disk and a head in a sealed case, but it has no current supply source to drive them and has no controller to control the disk and head. The driving device has the current supply source and/or the controller. The disk cartridge may be considered as being an easily exchangeable hard disk.

6 Claims, 14 Drawing Sheets

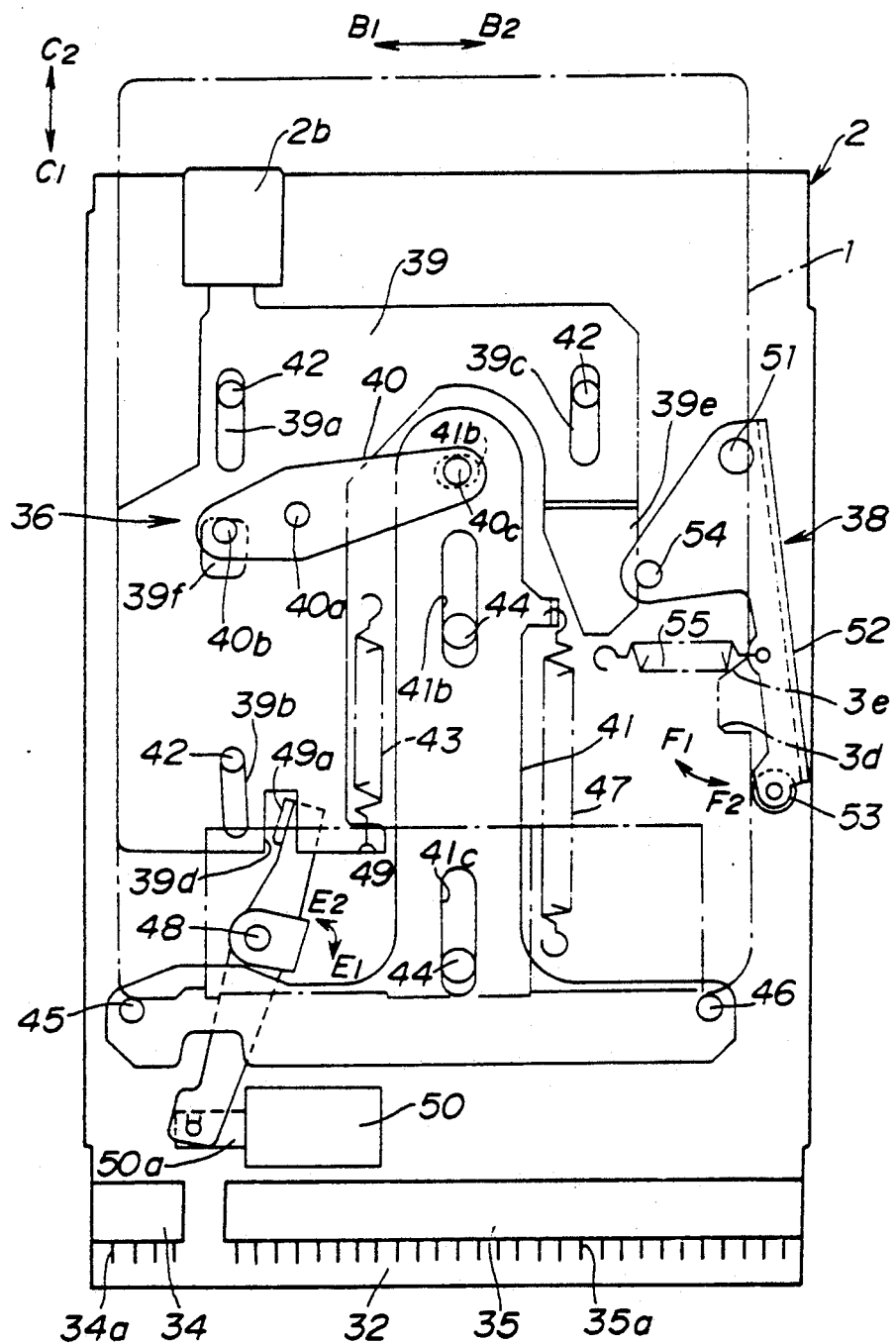

MAGNETIC DISK DRIVE HAVING A MECHANISM FOR PREVENTING A DISK CARTRIDGE FROM BEING INSERTED THEREIN WITH WRONG ORIENTATION AND FOR FIXING THE DISK CARTRIDGE INSERTED THEREIN WITH CORRECT ORIENTATION

BACKGROUND OF THE INVENTION

The present invention relates generally to magnetic disk drives, and more particularly to a magnetic disk drive having a mechanism for loading and holding a disk inserted with a correct orientation at a predetermined position, and for preventing a disk inserted with a wrong orientation from being loaded into the predetermined position. The term "a correct orientation", as used herein, means the sole orientation in which the disk can be driven at the predetermined position. And the term "a wrong orientation", as used herein, means any one orientation except the correct orientation.

Among magnetic disk drives, hard disk drives have been used as memory means for computers. Hard disks have been more improved than so-called floppy disks in TPI (track per inch) and BPI (bit per inch) so that the hard disks can be recorded with high density. The hard disk is fixed in a sealed-up housing to prevent dust from the outside attaching itself thereto so that it can be recorded with high density.

Consequently, information recorded on the hard disk cannot be used generally except in a computer which includes the hard disk drive. And when the hard disk is overflown, as the disk cannot be easily exchanged, it is troublesome to exchange the hard disk drive itself.

Accordingly, this applicant has developed a disk drive comprising a disk cartridge and a driving device. The term "a disk cartridge", as used herein, means an apparatus which comprises at least a disk and a head in a sealed case, but has no current supply source to drive them and has no controller to control them. The term "a driving device", as used herein, means an apparatus that has the current supply source and/or the controller. The disk cartridge can be easily connected and disconnected from the driving device. The driving device may be connected to an external computer, such as a host computer, and the disk cartridge can be driven and controlled by the driving device and/or the external computer. Therefore the disk cartridge may be considered as being an easily exchangable hard disk.

A conventional magnetic disk drive having a holder in which a floppy disk is inserted is usually equipped with a mis-insert preventing mechanism, as shown in Japanese Laid-Open Patent Application No. 64-30068. The disclosed mis-insert preventing mechanism comprises a floppy disk having a first corner chamferred with a different angle from other chamferred corners and a stopper located in the holder having an inclined plane engagable only with the first corner. The floppy disk can be loaded into a predetermined position only when the first corner is engaged with the stopper. Therefore, when the floppy disk is to be inserted with the wrong orientation, it is blocked from being inserted any more because the inclined plane is not engaged with one of the other corners. On the other hand, in the conventional magnetic disk drive the holder usually decends with the floppy disk so as to be held by a holding mechanism which is provided in addition to the mis-insert prevent mechanism.

Therefore, it is difficult to miniaturize the conventional magnetic disk drive including two individual mechanisms, the mis-insert preventing mechanism and the holding mechanism and a holder movable upward and downward. In addition, the disk cartridge developed by the applicant must be miniaturized and thin. However an effective mis-insert preventing mechanism and holding mechanism have not been suggested in a magnetic disk drive in which a holder is fixed.

SUMMARY OF THE INVENTION

Accordingly, it is a general object of the present invention to provide a novel and useful magnetic disk drive in which the problems described above are eliminated.

Another object of the present invention is to provide a magnetic disk drive having a mechanism for loading and holding a disk inserted with a correct orientation at a predetermined position, and for preventing a disk being inserted with a wrong orientation from being loaded into the predetermined position, the mechanism comprising as few members as possible.

Another more specific object of the present invention is to provide a magnetic disk drive which comprises a magnetic disk, a disk cartridge shaped like an approximately rectangular parallelpiped having at least one first corner chamferred with a first shape different from other chamferred corners, a groove at the side thereof, and the magnetic disk therein, a housing, a holder fixed with the housing having a load position therein, the disk cartridge being able to be inserted into the holder into the load position and ejected from the holder, the magnetic disk being able to be driven when the disk cartridge is inserted with a first orientation into the load position, a holding member mounted to be movable from a first position to a second position in the holder; the holder having a second shape exchangeable with the first corner and the groove of the dusk cartridge, the holding member being located at the first position to block the inserting of the disk cartridge into the load position before the disk cartridge is inserted, and, when the disk cartridge is inserted with a first direction, the holding member being engaged with the first corner and then the holding member moving to the second position to allow the disk cartridge to be inserted into the load position, the holding member being engaged with the groove of the disk cartridge to hold the disk cartridge at the load position after the disk cartridge is inserted into the load position, whereas the holding member stays at the first position to block the disk cartridge from being inserted when the disk cartridge is inserted in a direction different from the first direction because the holding member cannot be engaged with one of the other corners different from the first corner, and a driving device, provided in the housing, for driving the magnetic disk in the disk cartridge at the load position.

Other objects and further features of the present invention will be apparent from the following detailed description when read in conjunction with the accompanying drawings.

BRIEF DESCRIPTION OF THE DRAWINGS

FIG. 12 is a plane view for explaining the ejecting operation;

DESCRIPTION OF PREFERRED EMBODIMENTS

Figure 1:
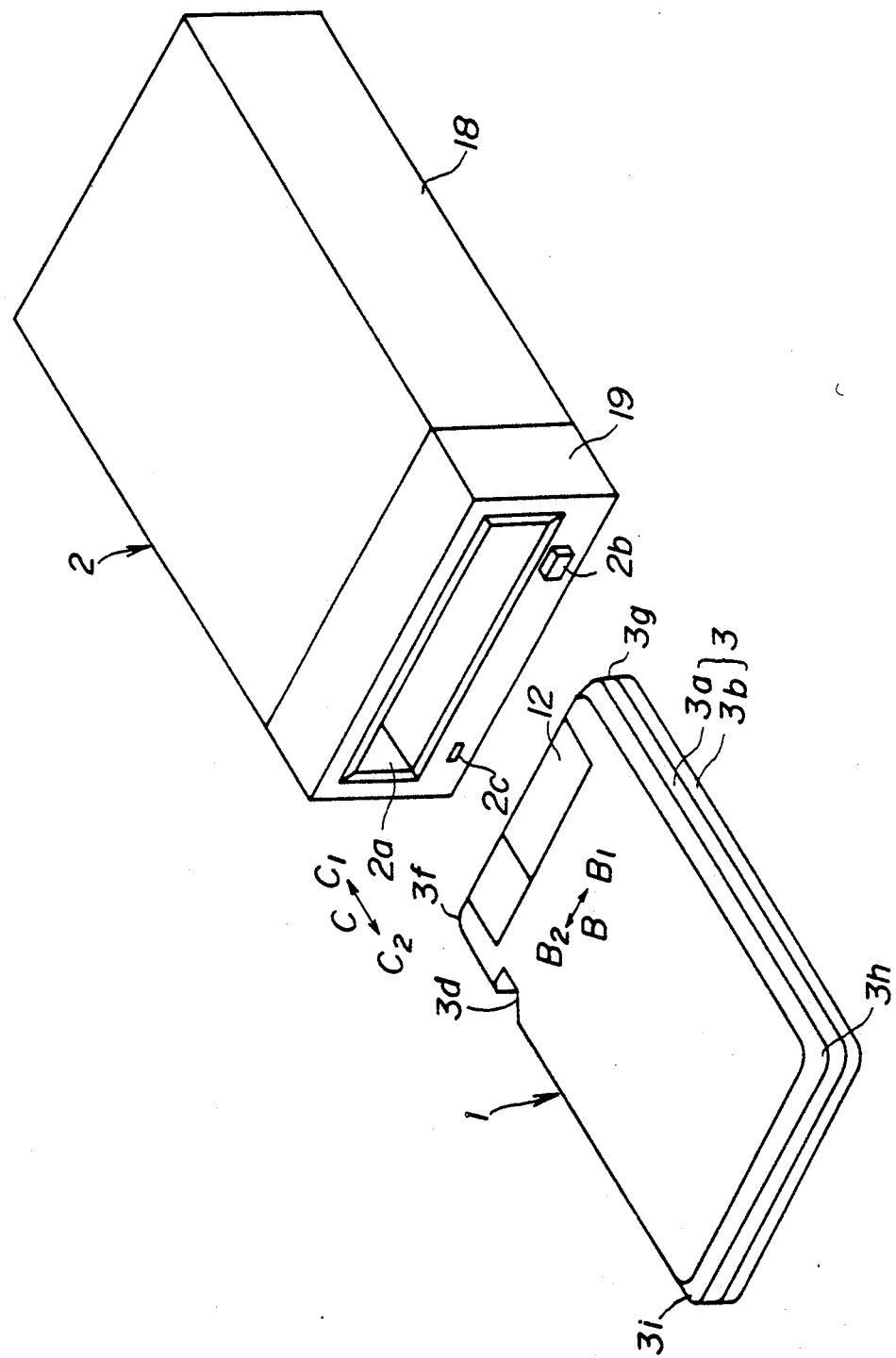
FIG. 1 is a perspective view of a magnetic disk drive according to the present invention.

A detailed description will now be given of a magnetic disk drive according to the present invention. Referring to FIG. 1, the magnetic disk drive comprises a disk cartridge 1 and a driving device 2. The driving device 2 supplies electric power to the disk cartridge 1 to drive it while the disk cartridge 1 is inserted into the driving device 2 from a frontal insert entrance 2a. The disk cartridge 1 can be easily inserted into and ejected from the driving device 2, and it is to be inserted only when it is used like a floppy disk. A plurality of disk cartridges with different memory capacities may be prepared, and one of them may be selected depending upon the kind or amount of information.

The driving device 2 is connected to an external computer (not shown). Therefore it is possible to transfer the information easily from the computer to the disk cartridge 1.

Figure 2A:
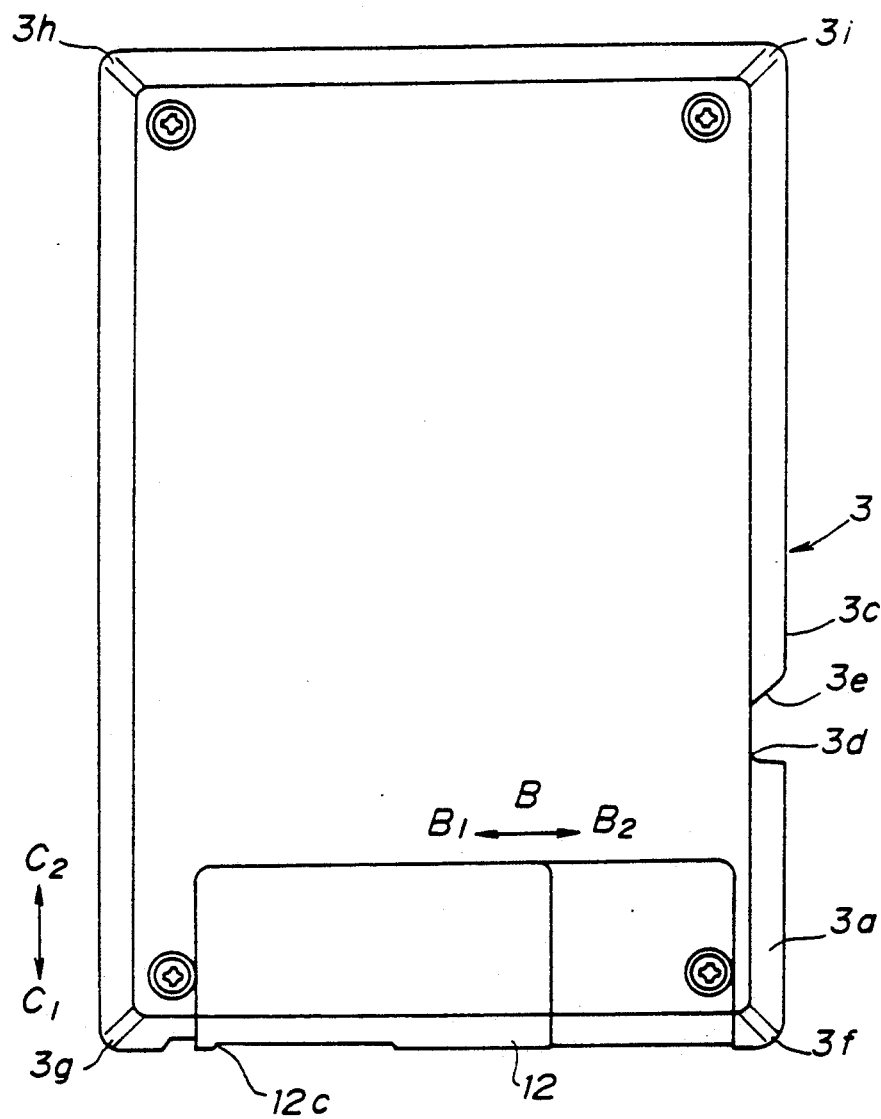
FIG. 2(A) and FIG. 2(B) are respectively a plane view and a front view of a disk cartridge shown in FIG. 1.
Figure 2B:
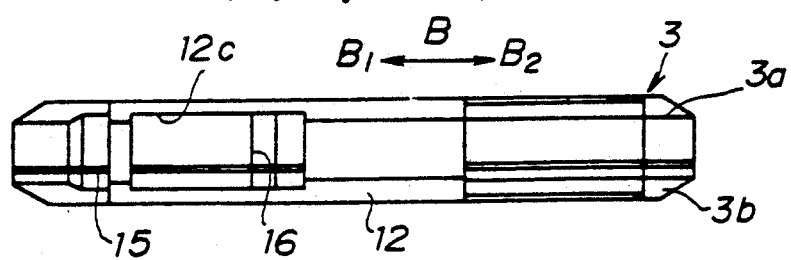
Figure 3A:
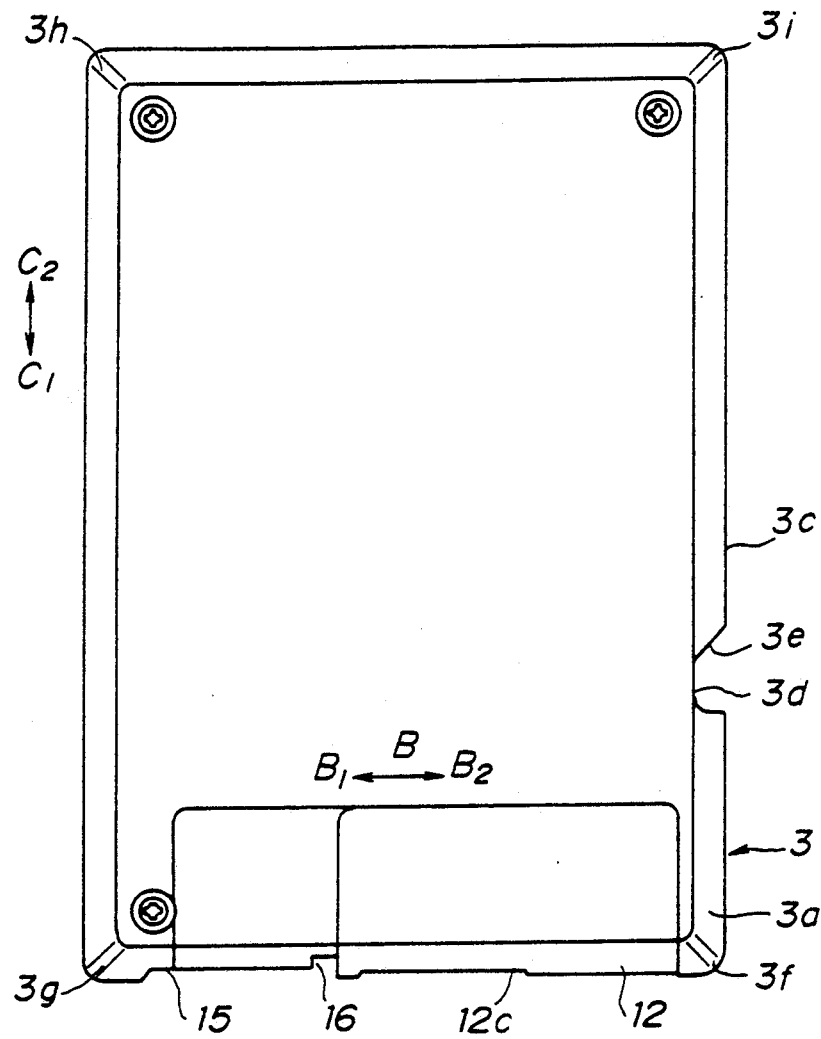
FIG. 3(A) and FIG. 3(B) are respectively a plane view and a front view of the disk cartridge when a shutter opens.
Figure 3B:
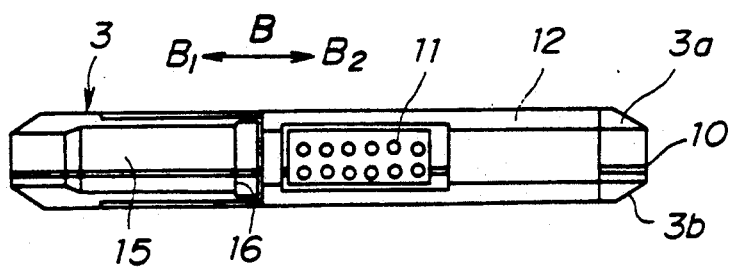
Figure 4A:
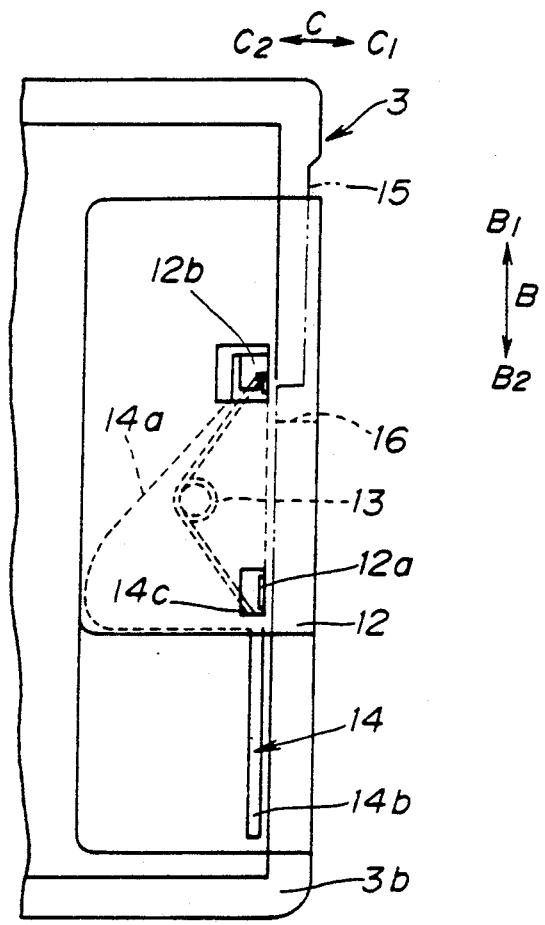
FIG. 4(A), FIG. 4(B) and FIG. 4(C) are respectively a plane view, a cross-sectional view and a perspective view for explaining the operation of the shutter.
Figure 4B:
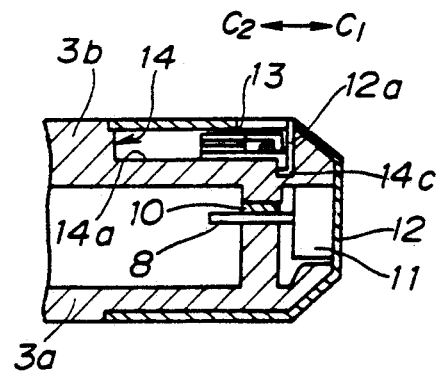

In this embodiment, the disk cartridge 1 has a single hard disk, however, needless to say, the present invention can be applied to a plurality of disks. As shown in FIG. 1 and FIG. 2, the disk cartridge 1 is enclosed in a sealed-up case 3 to prevent dust from attaching itself thereto. As shown in FIG. 4(B), the case 3 comprises an upper case 3a and a lower case 3b, and located in the junction between them is an elastic member 10 which keeps the case 3 airtight. The electric power is supplied from the driving device 2 to the disk cartridge 1 via a connector 11. The connector 11 is connected with a junction 8b as shown in FIG. 5 of a flexible printed circuit board 8, and the electric power is supplied to every part of the disk cartridge 1 via the flexible printed circuit board 8.

Figure 5:
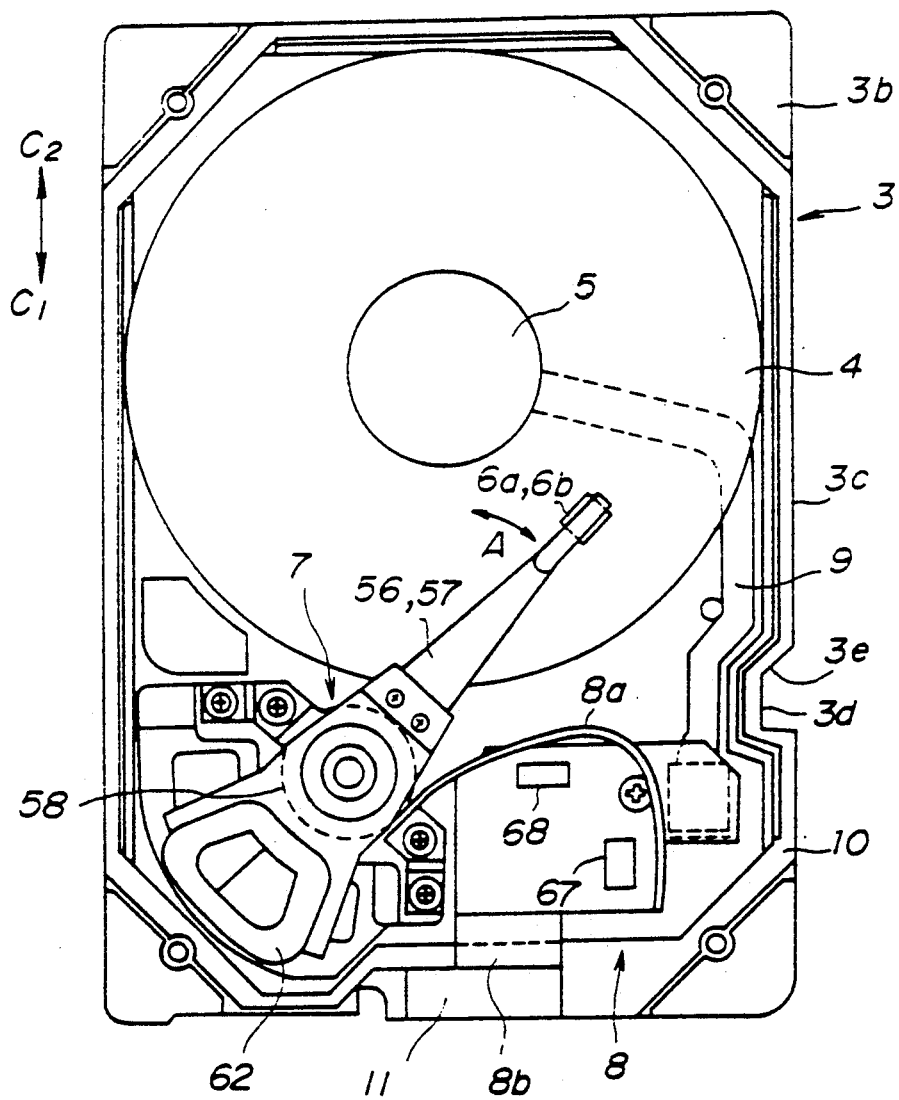
FIG. 5 is a plane view of the disk cartridge without an upper case.
Figure 6:
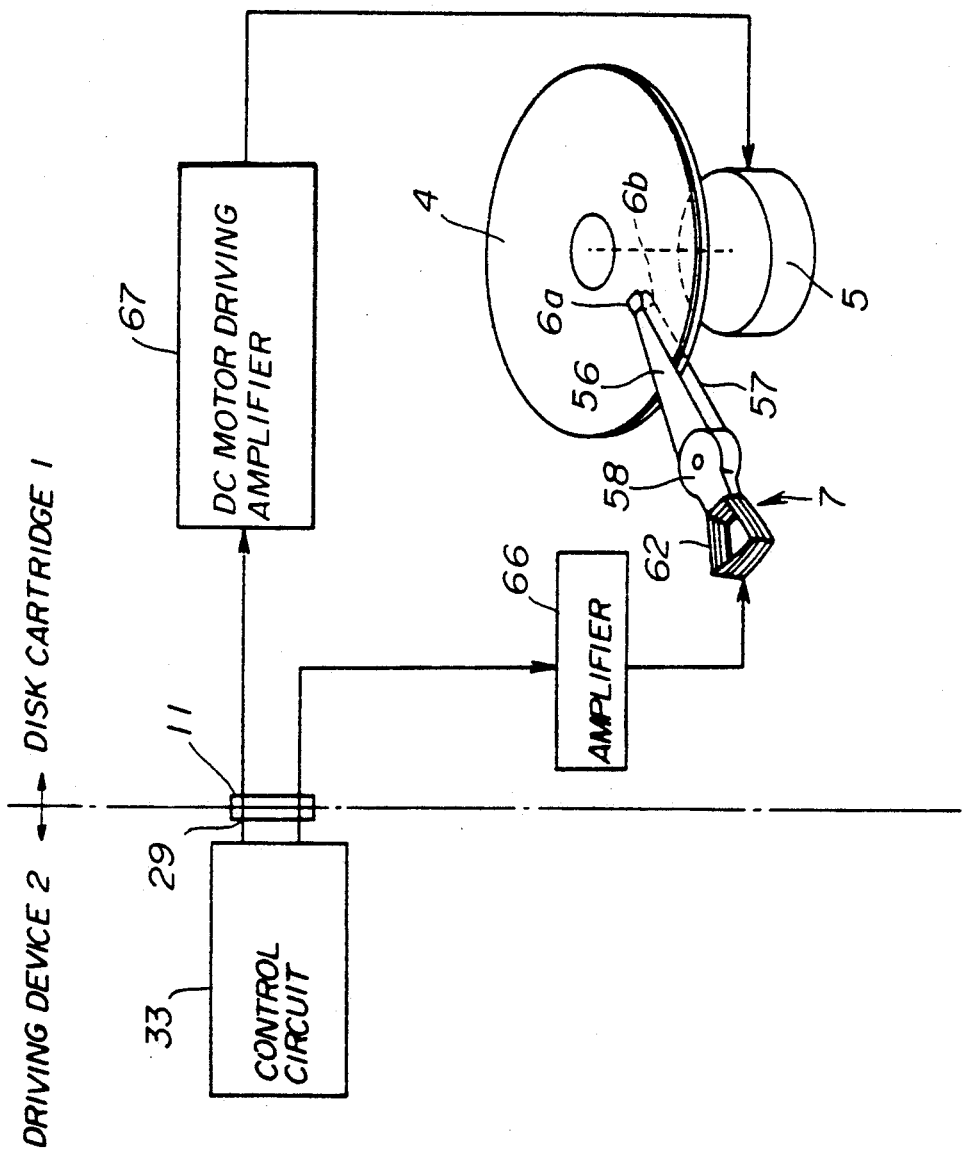
FIG. 6 is a system block diagram showing a general circuit arrangement which drives an actuator and a motor.

As shown in FIG. 5, the disk cartridge 1 comprises a magnetic disk 4, a spindle motor 5 to rotate the disk 4, magnetic heads 6a and 6b, a pair of head arms 56 and 57 with magnetic heads 6a and 6b at the tops thereof, and an actuator 7 for swinging the head arms 56 and 57. The disk cartridge 1 has a disk rotating mechanism for rotating the disk 4 when it is recorded or reproduced. As shown in FIG. 5 and FIG. 6, the disk rotating mechanism within the disk cartridge comprises the spindle motor 5, a rotor (not shown), and a DC motor driving amplifier 67. The disk 4 is attached to the rotor of the motor 5 and they both rotate together. The rotating speed of the motor 5 is determined by the amplifier 66, and controlled by a control circuit 33. The electric power is supplied to the motor 5 by the flexible printed circuit board 8 via a junction code 9. The junction code 9 is pulled out via the side of the housing of the motor 5 and connected with the flexible printed circuit board 8.

The disk cartridge 1 has a head moving mechanism. The head moving mechanism is a mechanism for moving the heads 6a and 6b in an approximately radial direction of the disk 4, however, strictly speaking, it further includes a mechanism for moving the heads 6a and 6b from a recording position to a waiting position. The term "a recording position", as used herein, means a position of any one of the tracks on the disk 4. And the term "a waiting position", as used herein, means a position apart from the tracks on the disk 4. The head moving mechanism comprises magnetic heads 6a and 6b, head arms 56 and 57, an actuator 7 shown in FIG. 5, and an amplifier 67 shown in FIG. 6. As shown in FIG. 5 and FIG. 6, the actuator 7 rotates in the direction A, and moves the heads 6a and 6b in the approximate radial direction of the disk 4. The actuator 7 rotates by means of a supporting member 58. The actuator 7 and the heads 6a and 6b are electrically connected with the junction 8b via a wire 8a of the flexible printed circuit board 8. When the driving coil 62 is energized, the supporting member 58 rotates and the heads 6a and 6b move approximately radially on the disk 4 on the basis of the Fleming's rule. Rotation of the actuator 7 is also controlled by the control circuit 33 shown in FIG. 6. After recording and/or reproducing, the head arms 56 and 57 rotate clockwise. Because the disk cartridge 1 of the present invention is easily ejected and carried, it is easily subject to vibration. Accordingly, the heads are held not at the most inner track on the disk, but at the waiting position so that they do not crash the disk.

Figure 7:
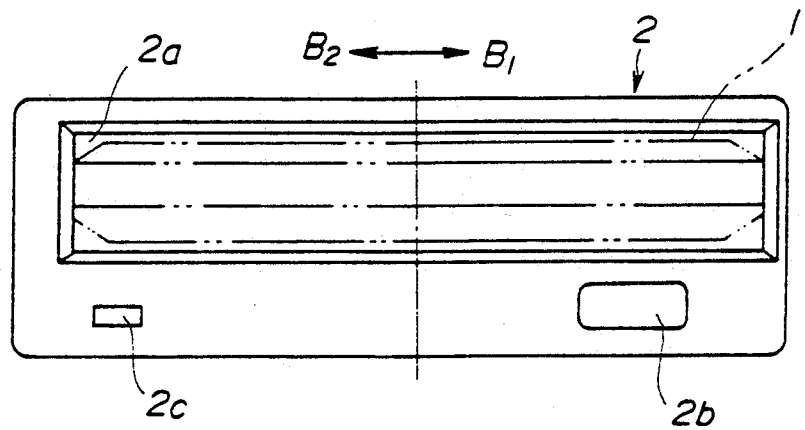
FIG. 7 is a front view of a driving device.

The driving device 2 has five mechanical mechanisms which cooperate with the disk cartridge 1, such as a loading mechanism, mis-insert preventing mechanism, on-off shutter mechanism, ejecting mechanism, and mis-eject preventing mechanism. A description will be given of the above five mechanical mechanisms. The driving device 2 has, as shown in FIG. 1 and FIG. 7, the insert entrance 2a, an eject button 2b and an indicator 2c at a frontal panel 19. The indicator 2c indicates the recording or reproducing of the disk cartridge 1.

Figure 9:
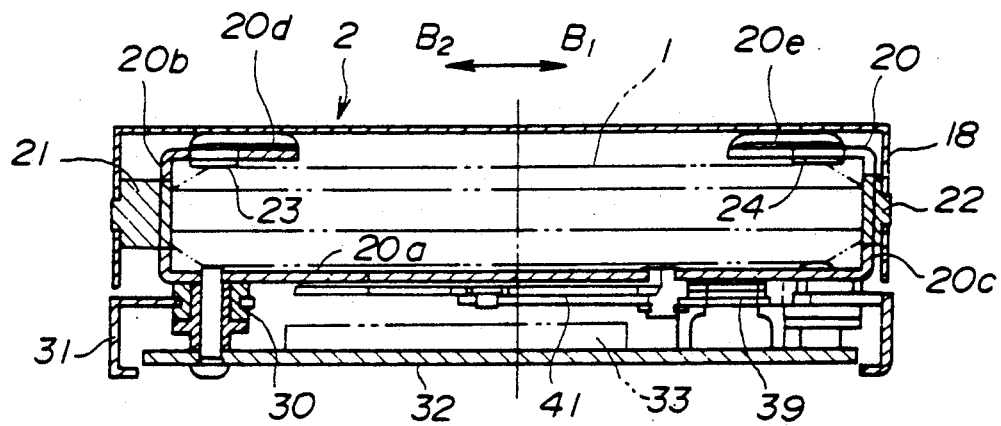
FIG. 9 is a cross-sectional view taken along line VIII-—VIII shown in FIG. 12.
Figure 8:
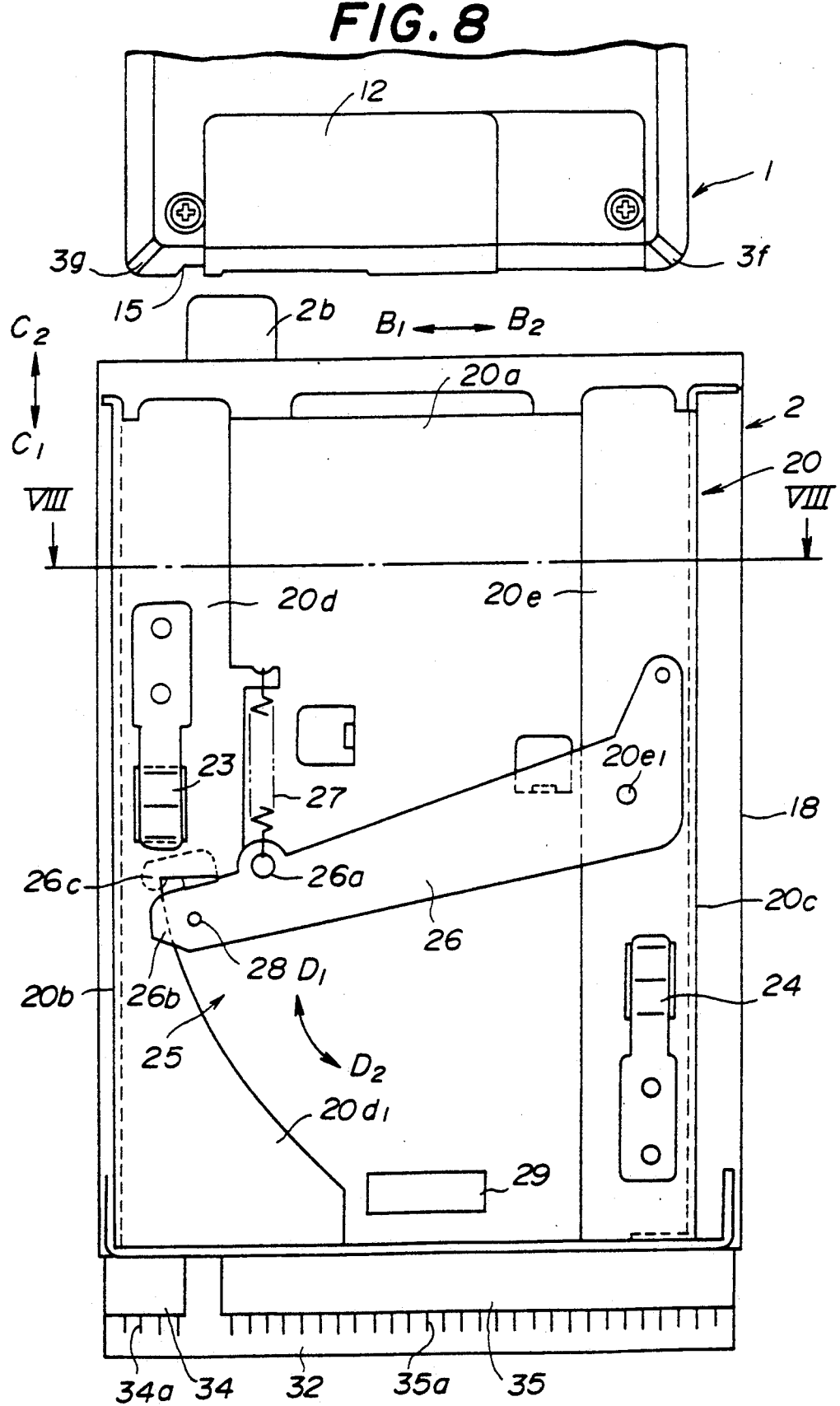
FIG. 8 is a plane view for explaining loading mechanism and on-off shutter mechanism.
Figure 13:
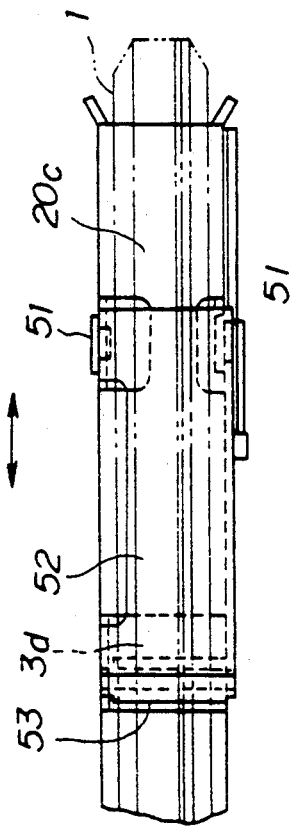
FIG. 13 is a side view of a mis-eject preventing mechanism.

The loading mechanism will be described first. The loading mechanism is a mechanism for loading the disk cartridge 1 inside the driving, device 2 when the disk cartridge 1 is inserted with the correct orientation via the insert entrance 2a. The loading mechanism comprises a holder 20. As shown in FIG. 8 and FIG. 9, the holder 20 is located inside a housing 18 of the driving device 2. The holder 20 comprises a base plate 20a, side plates 20b and 20c and crown plates 20d and 20e. The side plates 20b and 20c are bent upward from the base plate 20a. The crown plates 20d and 20e are bent respectively from the side plates 20b and 20c and are parallel and opposite to the base plate 20a. As shown in FIG. 13, both side plates 20b and 20c are fixed on the housing via supporting members 21 and 22. The base plate 20a is fixed on the base 32 with a chassis 31 via a vibration absorbing member 30. The crown plates 20d and 20e respectively have flat springs 23 and 24 which compress and hold the disk cartridge 1 while it is inserted. Thus, if the disk cartridge 1 is inserted with the correct orientation, it is held by the flat springs 23 and 24, and fixed inside the driving device 2. A connector 29 of the driving device 2 is connected with a connector 11 of the disk cartridge 1, and electric power is supplied by the driving device 2 to the disk cartridge 1 via the connectors 29 and 11. If an attempt is made to insert the disk cartridge 1 with the wrong orientation, it is prevented from being inserted by the mis-insert preventing mechanism. The shutter 12 which encloses the connector 11 is opened or closed by the on-off shutter mechanism.

Figure 11:
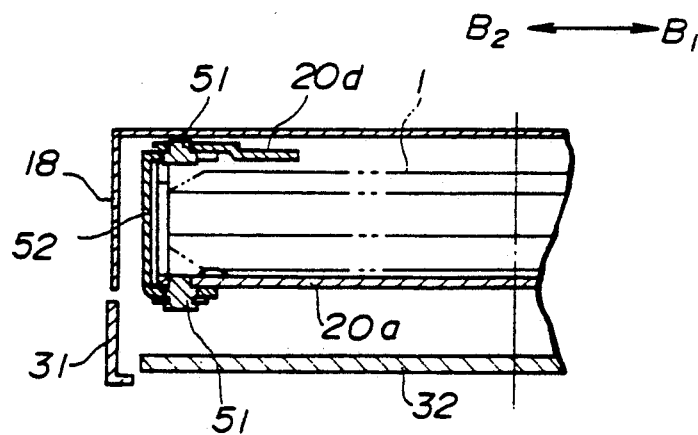
FIG. 11 is a front view taken along line X—X shown in FIG. 10.

The mis-insert preventing mechanism 38 is a mechanism for allowing the disk cartridge 1 to be inserted with only the correct orientation. A description will be given of the mis-insert preventing mechanism with reference to FIG. 2 (A), and FIG. 10 through FIG. 13. The mis-insert preventing mechanism comprises a lock lever 52, a roller 53, and a pin 54 of the driving device 2, and a lock-groove 3d and the corners 3f through 3i of the disk cartridge 1. One of the characteristics of the mis-insert preventing mechanism 38 according to the present invention is that the roller 53 holds the disk cartridge 1 inserted with the correct orientation at the predetermined position, and blocks the disk cartridge 1 inserted with the wrong orientation from being loaded into the predetermined position. The lock-groove 3d is formed on the case 3 at the right side 3c shown in FIG. 2(A). The lock-groove 3d has an inclined plane 3e which is inclined to the eject direction ($C_2$ direction). The corner 3f is chamferred with a larger radius than other corners 3g through 3i. The lock lever 52 is mounted on the side plate 20c pivotably around shafts 51. The roller 53 is located at the end of the locking lever 52, and can be engaged with the corner 3f and the lock-groove 3d. The roller 53, lock-groove 3d and corner 3f may be arranged differently from this embodiment as long as the roller 53 can be engaged with the lock-groove 3d and the corner 3f. The pin 54 slidably touches the pushing portion 39e of the eject lever 39. The lock lever 52 is forced pivotably in a direction $F_1$ by the tensile force of the coil spring 55 which is engaged with the base plate 20a at its end thereof. The shaft 51 and the lock lever 52 do not block the inserting of the disk cartridge 1, whereas the roller 53 is located to block the disk cartridge 1. When the disk cartridge 1 is to be inserted with the correct orientation, the corner 3f pushes out the roller 53 in the direction $F_2$. The corner 3f is chamferred with a large radius, so a point where the corner 3f touches the roller 53 is far from the lock lever 52. Therefore, because of a moment counterclockwise around the shaft 51 generated by the above touching, the roller 53 can rotate in the direction $F_2$. When the disk cartridge 1 is inserted completely, the lock lever 52 pivots in the direction $F_1$ by the spring 55, and the roller 53 is engaged with the lock-groove 3d to hold the disk cartridge 1 in the holder 20. Because of the inclined plane 3e, the roller 53 is easily engaged with the lock-groove 3d. Thus, the disk cartridge 1 is fixed at the predetermined position, and is connected with the driving device 2 electrically. As shown in FIG. 11 and FIG. 13, the shafts 51 are located opposite to each other.

Figure 10:
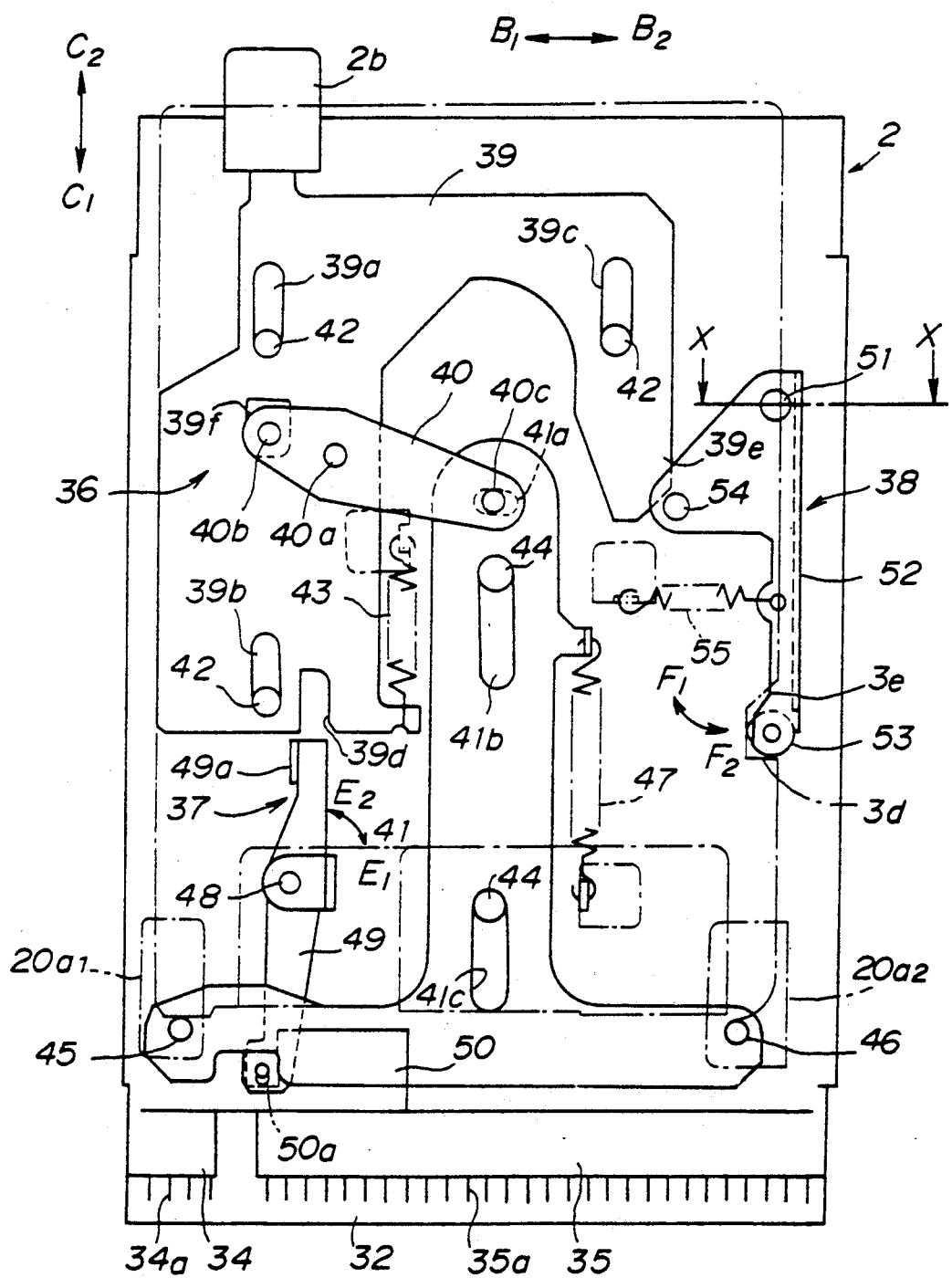
FIG. 10 is a plane view for explaining each mechanism in the driving device.

As shown in FIG. 10 and FIG. 12, the disk cartridge 1 is ejected as follows. The eject button 2b is pushed, and the pushing portion 39e of the eject lever 39 pushes the pin 54. Then the lock lever 52 is pivoted in the direction $F_2$ so that the roller 53 sets free the disk, cartridge 1. When the disk cartridge 1 is to be inserted with the wrong orientation, in other words, when one of the corners 3g through 3i touches the roller 53, the roller 53 cannot be pushed out in the direction $F_2$ because it is smaller chamferred than the corner 3f. Because a point where one of the corners 3g through 3i touches the roller 53 is so close to the lock lever 52 a moment sufficient to rotate the roller 53 in the direction $F_2$ is not generated by the touching. Therefore the disk cartridge 1 is prevented from being mis-inserted in the vicinity of the roller 53. Since the roller 53 also holds the disk cartridge 1 inside the driving device 2, the mis-insert preventing mechanism according to the present invention serves two functions, despite its being comprised of only a few members.

The on-off shutter mechanism of the disk cartridge 1, which is usually closed for protecting the connector 11 from dust, is a mechanism for opening the shutter 12, only when the connector 11 is connected with the connector 29.

Figure 4C:
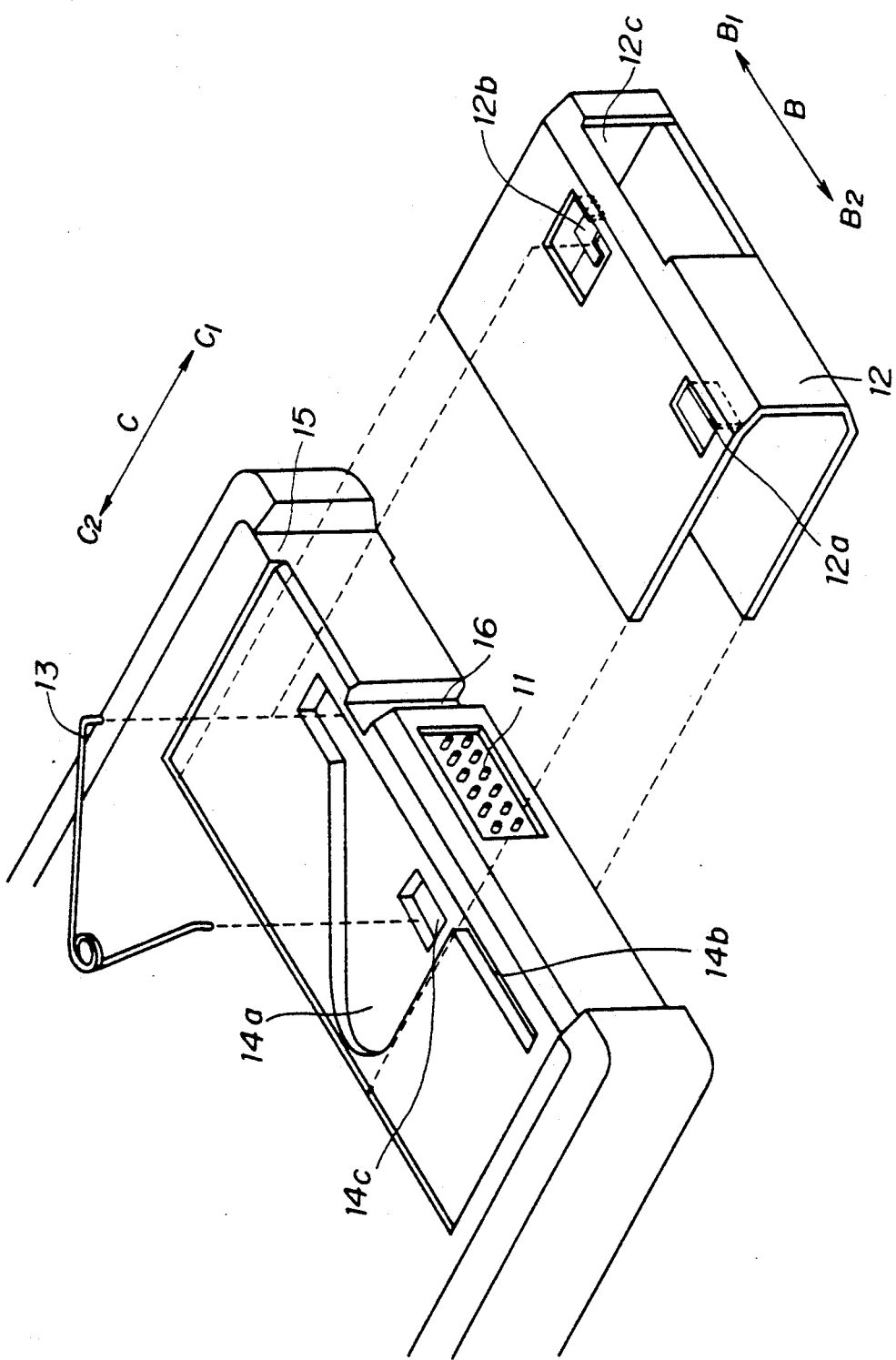

Before explaining the on-off shutter mechanism 25, operation of the shutter 12 of the disk cartridge 1 will be described below. Referring to FIG. 4(A), FIG. 4(B) and FIG. 4(C), the connector 11 is enclosed and protected from dust by the shutter 12. The shutter 12 can be slid in a direction B along the side of the case 3. The shutter is slid by mechanism of engagement between two tabs 12a of the shutter 12 and a groove 14. As shown in FIG. 4(C), the groove 14 is located under the lower case 3b about the connector 11. The groove 14 comprises a spring chamber 14a, a guide portion 14b and a concave portion 14c. A torsion spring 13 is accommodated in the spring chamber 14a. And the guide portion 14b guides the tabs 12a in the direction B. The two tabs 12a are coupled with the shutter 12, and both engage with the groove 14. One end of the spring 13 is engaged with a hook 12b, and the other end is engaged with a concave portion 14c. Therefore the shutter 12 is forced by the spring 13 in the direction $B_1$ when the shutter 12 is slid in the direction $B_2$. The force of the spring 13 in the direction $B_1$ is not zero even when the shutter 12 is not slid so that the shutter 12 can always protect the connector 11 from dust.

Figure 15:
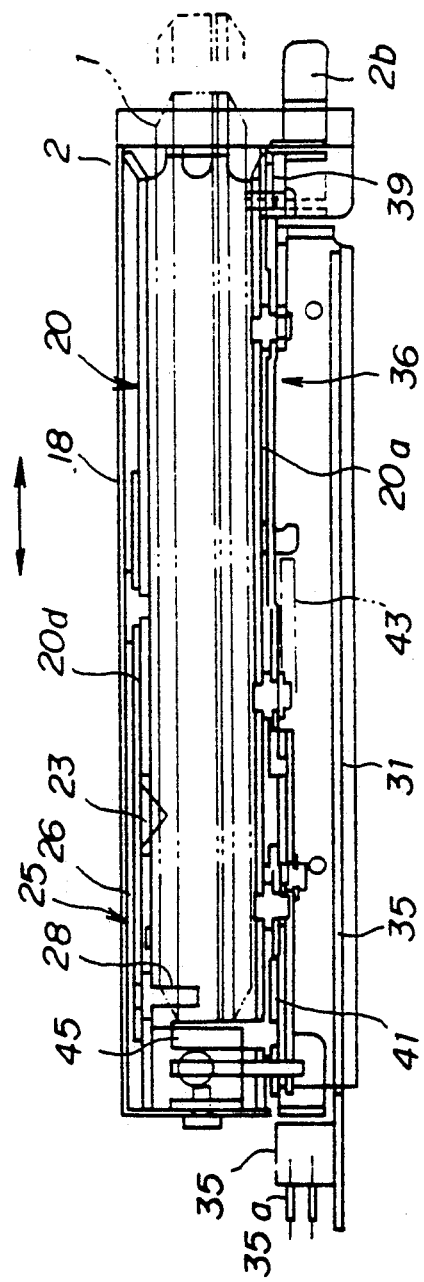
FIG. 15 is a cross-sectional view of a holder in which the disk cartridge is inserted.
Figure 14:
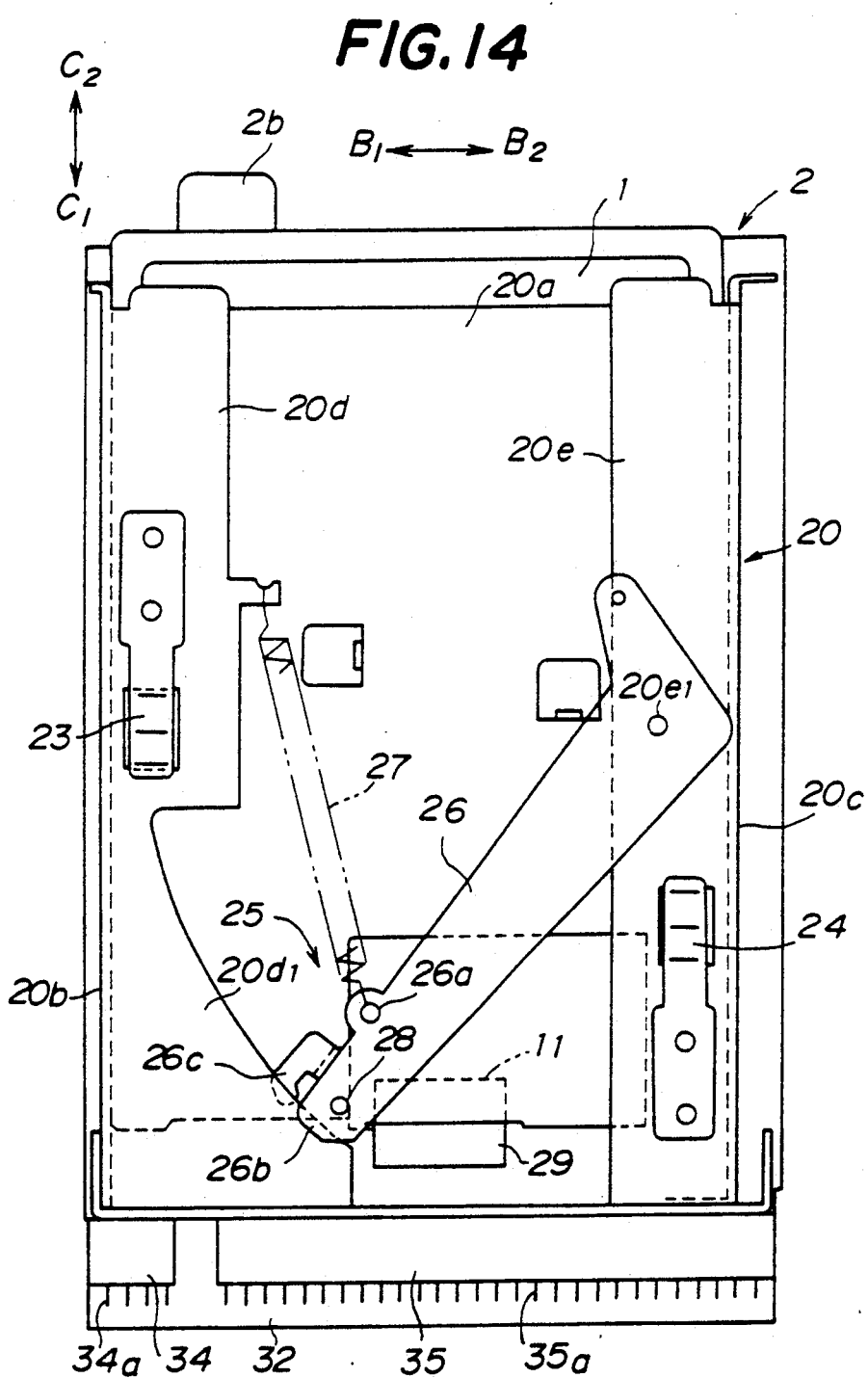
FIG. 14 is a cross-sectional view for explaining the on-off shutter mechanism.

Next, the on-off shutter mechanism 25 will be described in detailed with reference to FIG. 8, FIG. 14 and FIG. 15. The on-off shutter mechanism 25 comprises a pivot lever 26, a coil spring 27 and a pin 28. The pivot lever 26 is mounted pivotably around an axis $20e_1$ on the crown plate 20e. The coil spring 27 is engaged with a hole 26a in the pivot lever 26 at one end thereof, and is engaged with the crown plate 20d at the other end thereof. Therefore the pivot lever 26 is forced by the spring 27 in the direction $D_1$. The pin 28 projects into the holder 20 at the top of the pivot lever 26. When the disk cartridge 1 is inserted, the pin 28 is inserted into an indentation 15 of the disk cartridge 1, and is engaged with one end of the shutter 12. As the disk cartridge 1 is inserted, the pivot lever 26 pivots around the axis $20e_1$, and slides along a arc $20d_1$. A hook 26c which extends from a top end 26b of the pivot lever 26 holds the crown plate 20d with the top end 26b so that the pivot lever 26 can always slide along the arc $20d_1$. The pin 28 slides the shutter 12 in the direction $B_2$ as the pivot lever 26 pivots. When a cutout portion 12c of the shutter 12 comes to a position corresponding to the connector 11, the pin 28 is engaged with a slot 16 which is formed on the indentation 15 so that the shutter 12 is locked at an opening position. Thus the connector 11 can be connected with the connector 29 of the driving device 2. The connector 29 is located on the base plate 20a, and the driving device is connected with a computer via connectors 34 and 35 with lots of connector pins 34a and 35a. The term "an opening position", as used herein, means a position where the connector 11 is laid bare. On the other hand, when the disk cartridge 1 is ejected, the shutter 12 is always locked at a closing position to protect the connector 11. Thus even when the disk cartridge 1 is ejected and carried, the case 3 is kept airtight. The term "a closing position", as used herein, means a position where the connector 11 is enclosed by the shutter 12.

The ejecting mechanism is a mechanism for ejecting the disk cartridge 1 which is inserted into the driving device 2. The eject mechanism 36 will be described with reference to FIG. 10, FIG. 12 and FIG. 15. As shown in FIG. 10, the eject mechanism 36 comprises the eject lever 39, a link 40 and a slider 41.

The eject lever 39 has slits 39a through 39c, and pins 42 which are mounted on the base plate 20a engaged with them. Therefore the eject lever 39 can be slid in the direction C. FIG. 15 shows the configuration between the base plate 20a and the eject lever 39. The eject lever is engaged with one end of a coil spring 43, the other end of which is engaged with the base plate 20a. Because the coil spring 43 is located in the direction $C_2$, the eject lever 39 is forced by the spring 43 in the direction $C_2$. The eject button 2b is attached at the top of the eject lever 39. The eject lever 39 has a gain 39d which is engaged with the mis-eject prevent mechanism described later, and the pushing portion 39e which is engaged with the mis-insert prevent mechanism 38 described above.

The link 40 is mounted pivotably around a shaft 40a which is supported between the eject lever 39 and the base plate 20a. The link 40 has pins 40b and 40c at the ends thereof respectively. The pin 40b is engaged with a hole 39f of the eject lever 39, and the pin 40c is engaged with a hole 41a of the slider 41.

The slider 41 is formed as a T-shape in the direction $C_1$. The slider 41 has slits 41b and 41c in the direction $C_1$. The slits 41b and 41c are engaged with pins 44 mounted on the base plate 20a. Therefore the slider 41 can be slid in the direction C. The slider 41 has eject pins 45 and 46 at the right and left ends of the T-shape thereof. The eject pins 45 and 46 are engaged with the end of the disk cartridge 1. The eject pins 45 and 46 project into the holder 20 through the entrances $20a_1$ and $20a_2$ of the base plate 20a. The slider 41 is engaged with one end of a coil spring 47, the other end of which is engaged with the base plate 20a. The coil spring 47 is located in the direction $C_1$, and the slider 41 is forced by the spring 47 in the direction $C_1$.

When the eject button 2b is pushed, as shown in FIG. 12, the eject lever 39 is moved in the direction $C_1$, and the pin 40b is forced in the direction $C_1$. As a result, the link 40 pivots counterclockwise around the shaft 40a on the basis of the principles of the lever, and the pin 40c is forced in the direction $C_2$. Thus, the pin 40c moves the slider 41 in the direction $C_2$, and as shown in FIG. 12, the eject pins 45 and 46 push the end of the disk cartridge 1 to eject. After ejecting, the eject lever 39 and the slider 41 is reset at the predetermined position respectively by means of tensile forces of springs 43 and 47.

Figure 16A:
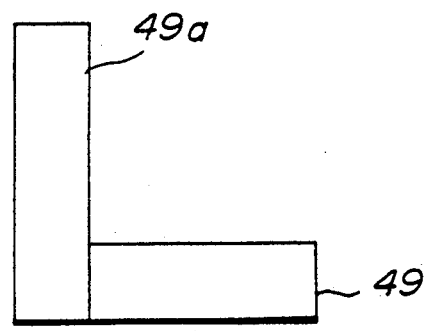
FIG. 16(A) and FIG. 16(B) are respectively a front view and a side view for explaining a projection.
Figure 16B:
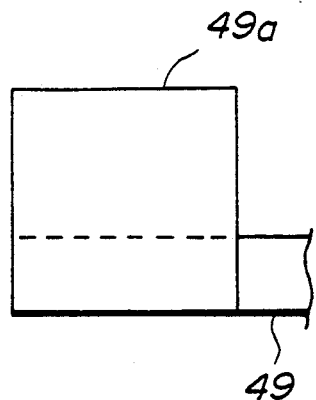

Lastly, the mis-eject preventing mechanism will be described below with reference to FIG. 10, FIG. 12 and FIG. 16. The mis-eject preventing mechanism is a mechanism for preventing the disk cartridge 1 from being ejected during recording or reproducing. The mis-eject preventing mechanism 37 comprises a lever 49 and a solenoid 50 which pivots the lever 49. The lever 49 is mounted pivotably around a shaft 48 which is supported on the base plate 20a. The lever 49 has a projection 49a at one end thereof, and is engaged with a plunger 50a of the solenoid 50 at the other end thereof. The projection extends upward so that the eject lever 39 can be moved in the direction $C_1$ and the disk cartridge 1 can be ejected only when the projection is engaged with the gain 39d of the eject lever 39. The projection 49a is formed like a rectangular plate as shown in FIG. 16(A) and FIG. 16(B), however it may be formed as other figures as long as it touches the ejecting lever when it is not engaged with the gain 39d. The solenoid 50 is magnetized while the heads 6a and 6b are located on tracks on the disk 4, and is erased magnetically while the heads 6a and 6b are located at the waiting position. Therefore while the heads 6a and 6b record or reproduce, the solenoid 50 is magnetized, and the lever 49 is pivoted in the direction $E_2$. Consequently the eject lever 39 touches the projection 49a and the disk cartridge 1 cannot be ejected. However when recording or reproducing is over, the heads 6a and 6b are moved to the waiting position, so the solenoid 50 is erased magnetically. Consequently, as shown in FIG. 12, the lever 49 is pivoted in the direction $E_1$, and the projection 49a is engaged with the gain 39d to allow the disk cartridge 1 to be ejected.

Further, the present invention is not limited to these preferred embodiments, but various variations and modifications may be made without departing from the scope of the present invention.

What is claimed is:

1. A magnetic disk drive comprising:
   a magnetic disk;
   an approximately rectangular parallelepiped disk cartridge, accommodating said magnetic disk therein, which comprises one first corner chamferred with a first shape different from other chamferred corners and a groove at a side thereof;
   a housing;
   a holder, fixed in said housing, having a load position therein, said disk cartridge adapted to be inserted into said holder into the load position and ejected from said holder, said magnetic disk adapted to be driven when said disk cartridge is inserted with a first orientation into the load position;
   a holding member, mounted to be movable from a first position to a second position in said holder, said second position being coplanar with said first position, said holding member having a second shape engageable with the first corner and the groove of said disk cartridge, said holding member being located at the first position to block the inserting of said disk cartridge into the load position before said disk cartridge is inserted, and, when said disk cartridge is to be inserted with a first orientation, said holding member being engaged with the first corner and then said holding member moving to the second position to allow said disk cartridge to be inserted into the load position, said holding member being engaged with the groove of said disk cartridge to hold said disk cartridge at the load position after said disk cartridge is inserted into the load position, whereas said holding member stays at the first position to block said disk cartridge from being inserted when said disk cartridge is to be inserted with an orientation different from the first orientation because said holding member is prevented from being engaged with one of the other corners different from the first corner;

a driving device, provided in said housing, for driving said magnetic disk in said disk cartridge at the load position;

said disk cartridge further comprising a disk motor rotating means for rotating said magnetic disk; and a magnetic head which records information on said magnetic disk and/or reproduces information therefrom.

2. A magnetic disk drive according to claim 1, wherein the first corner is chamferred with a larger radius than the other corners.

3. A magnetic disk drive according to claim 1, wherein said holding member further comprises:

a shaft, arranged approximately vertical to an inserting direction of said disk cartridge, the shaft allowing said disk cartridge to be inserted;

an arm, which is coupled to the shaft at an end thereof so as to be pivotable around the shaft;

a spring member, an end of which is fixed by said holder, the other end of which is engaged with the arm, and the arm being forced by the spring member to a rotational direction in order to block the inserting of said disk cartridge; and an engaging member having the second shape, engaged with the other end of the arm, the engaging member being located at the first position before said disk cartridge is inserted, the engaging member being engaged with the first corner of said disk cartridge, if said disk cartridge is to be inserted with the first orientation, and then the engaging member moving to the second position to allow said disk cartridge to be inserted into the load position, and the engaging member being engaged with the groove of said disk cartridge to hold the same at the load position after said disk cartridge is inserted into the load position, whereas the engaging member stays at the first position to block said disk cartridge from being inserted if said disk cartridge is to be inserted with the orientation different from the first orientation.

4. A magnetic disk drive according to claim 3, wherein said disk cartridge has the groove at a surface thereof opposite to said engaging member, the engaging member being engaged with the groove by means of the spring member when said disk cartridge is inserted into a position when the engaging member at the second position is opposite to the groove.

5. A magnetic disk according to claim 2, wherein said holding member further comprises:

a shaft, arranged approximately vertical to an inserting direction of said disk cartridge, said shaft allowing said disk cartridge to be inserted;

an arm, which is coupled to the shaft at an end thereof so as to be pivotable around the shaft;

a spring member, an end of which is fixed by said holder, the other end of which is engaged with the arm, and the arm being forced by the spring member to a rotational direction in order to block the inserting of said disk cartridge; and a roller having the second shape, engaged with the other end of the arm, the roller being located at the first position before said disk cartridge is inserted, the roller being engaged with the first corner of said disk cartridge, if said disk cartridge is to be inserted with the first orientation, and then the roller moving to the second position to allow said disk cartridge to be inserted into the load position since the first corner causes enough momentum for the roller to rotate around the shaft, and said roller being engaged with the groove of said disk cartridge to hold the same at the load position after said disk cartridge is inserted into the load position, whereas said roller stays at the first position to block said disk cartridge from being inserted if said disk cartridge is to be inserted with the orientation different from the first orientation since one of the other corners causes less than enough momentum required for the roller to rotate around the shaft.

6. A magnetic disk drive according to claim 3, wherein said driving device further comprises:

an eject button attached to a surface of said driving device;

an eject member coupled to the eject button; and a release member coupled to the eject button, the release member releasing the engaging of the engaging member and the groove in response to the pushing of the eject button, the eject member then ejecting said disk cartridge from said driving device.

* * * * *